(12) United States Patent
Young et al.

(10) Patent No.: US 11,390,457 B2
(45) Date of Patent: Jul. 19, 2022

(54) LOW VOLUME NITROGEN SYSTEMS

(71) Applicants: Gregory E. Young, Prescott Valley, AZ (US); Zane A. Miller, Loganville, GA (US)

(72) Inventors: Gregory E. Young, Prescott Valley, AZ (US); Zane A. Miller, Loganville, GA (US)

( * ) Notice: Subject to any disclaimer, the term of this patent is extended or adjusted under 35 U.S.C. 154(b) by 24 days.

(21) Appl. No.: 16/908,647

(22) Filed: Jun. 22, 2020

(65) Prior Publication Data
US 2020/0318795 A1 Oct. 8, 2020

Related U.S. Application Data

(63) Continuation-in-part of application No. 15/782,472, filed on Oct. 12, 2017, now abandoned.

(51) Int. Cl.
| | |
|---|---|
| *B65D 90/44* | (2006.01) |
| *G05D 7/06* | (2006.01) |
| *F17C 13/04* | (2006.01) |
| *G08B 21/18* | (2006.01) |
| *G08B 3/10* | (2006.01) |

(52) U.S. Cl.
CPC ............ *B65D 90/44* (2013.01); *F17C 13/04* (2013.01); *G05D 7/0623* (2013.01); *G08B 21/182* (2013.01); *F17C 2201/056* (2013.01); *F17C 2205/0332* (2013.01); *F17C 2205/0338* (2013.01); *F17C 2221/032* (2013.01); *F17C 2250/036* (2013.01); *F17C 2250/043* (2013.01); *F17C 2270/0173* (2013.01); *G08B 3/10* (2013.01)

(58) Field of Classification Search
CPC ......... B65D 90/44; B65D 90/38; F17C 13/04; F17C 2205/0332; F17C 2205/0338; F17C 2270/0173; F17C 2250/036; F17C 2221/032; F17C 2201/035; F17C 2201/054; F17C 2201/056; F17C 2270/0134; Y10T 137/3127; G05D 7/0623; G08B 21/182; G08B 3/10
See application file for complete search history.

(56) References Cited

U.S. PATENT DOCUMENTS

| | | | | |
|---|---|---|---|---|
| 1,858,610 | A | ‡ 5/1932 | Banning, Jr. .......... | B65D 88/74 220/745 |
| 2,732,095 | A | ‡ 1/1956 | Fashay .................. | B64D 37/32 220/88.3 |
| 2,860,815 | A | ‡ 11/1958 | Finn ....................... | C10G 33/06 137/14 |

(Continued)

*Primary Examiner* — David Colon-Morales
(74) *Attorney, Agent, or Firm* — Bycer & Marion, PLC; Matthew L. Bycer; Michael B. Marion

(57) ABSTRACT

A system to maintain an inert ullage in a hydrocarbon tank. The system provides for outgassing/venting of ullage gases when a high-pressure event is found within the tank. Further, when a low-pressure event occurs, during fuel discharge or based on ambient conditions, a source of inert gas, such as nitrogen) supplies gas on-demand to the hydrocarbon tank via a pressure regulator (preferably along the venting system) to maintain both the pressure and inerting of the ullage. A method for maintaining the inert ullage is also provided, whereby a low-pressure event triggers a supply of inert gas into the tank.

20 Claims, 3 Drawing Sheets

(56) References Cited

U.S. PATENT DOCUMENTS

| | | | | |
|---|---|---|---|---|
| 2,870,936 A ‡ | 1/1959 | Clayton | ............... | B64D 37/10 220/88.3 |
| 2,889,955 A ‡ | 6/1959 | Naulty | ............... | A62C 3/08 220/88.3 |
| 2,918,928 A * | 12/1959 | Rednour | ............... | B67D 7/3263 137/14 |
| 2,964,916 A ‡ | 12/1960 | William | ............... | B65D 90/44 220/88.3 |
| 3,132,659 A ‡ | 5/1964 | Kenyon | ............... | G05D 16/0663 137/39 |
| 3,467,349 A ‡ | 9/1969 | Gautier | ............... | B64D 37/32 169/45 |
| 3,693,915 A ‡ | 9/1972 | Ulanovsky | ............... | B64D 37/32 244/135 R |
| 3,732,668 A ‡ | 5/1973 | Nichols | ............... | B64D 37/32 220/88.3 |
| 3,788,039 A ‡ | 1/1974 | Bragg | ............... | B64D 37/32 220/88.3 |
| 3,830,307 A ‡ | 8/1974 | Bragg | ............... | A62C 3/06 169/11 |
| 4,378,920 A ‡ | 4/1983 | Runnels | ............... | B64D 37/32 137/209 |
| 5,094,267 A ‡ | 3/1992 | Ligh | ............... | F17C 13/025 137/488 |
| 5,423,344 A ‡ | 6/1995 | Miller | ............... | G05D 16/0691 137/209 |
| 5,660,204 A ‡ | 8/1997 | Piotrowski | ............... | F16K 17/10 137/454.5 |
| 5,764,716 A ‡ | 6/1998 | Eckardt | ............... | B01J 19/14 376/279 |
| 5,816,283 A * | 10/1998 | Ostand | ............... | A62C 99/0018 137/209 |
| 5,836,348 A ‡ | 11/1998 | Ostand | ............... | F16K 17/10 137/489 |
| 5,904,190 A ‡ | 5/1999 | Patel | ............... | A62C 3/06 141/198 |
| 5,979,481 A * | 11/1999 | Ayresman | ............... | B60K 15/03 137/14 |
| 6,326,896 B1 * | 12/2001 | McDermott | ............... | G01L 19/12 128/202.22 |
| 6,634,598 B2 ‡ | 10/2003 | Susko | ............... | B64D 37/32 137/209 |
| 6,843,269 B2 ‡ | 1/2005 | Verma | ............... | B65D 90/44 137/209 |
| 7,296,586 B2 * | 11/2007 | Hosoda | ............... | B65D 90/44 137/209 |
| 7,721,557 B1 * | 5/2010 | Stearns | ............... | F17C 7/02 62/48.2 |
| 9,511,874 B2 ‡ | 12/2016 | Tiger | ............... | B64D 37/32 |
| 10,036,509 B2 ‡ | 7/2018 | Markham | ............... | B67D 7/3236 |
| 2004/0046670 A1 * | 3/2004 | Adams | ............... | B65D 90/44 340/605 |
| 2004/0234338 A1 ‡ | 11/2004 | Monroe | ............... | B65D 90/503 405/54 |
| 2007/0125789 A1 * | 6/2007 | Abdo | ............... | F17C 3/00 220/694 |
| 2007/0157803 A1 ‡ | 7/2007 | McNeil | ............... | B01D 53/22 95/45 |
| 2009/0134171 A1 * | 5/2009 | deBerardinis | ............... | B65D 90/44 220/562 |
| 2009/0217822 A1 ‡ | 9/2009 | Cyr | ............... | C12C 13/10 99/276 |
| 2010/0025406 A1 * | 2/2010 | McRae | ............... | F17C 1/00 220/560.04 |
| 2010/0097232 A1 ‡ | 4/2010 | Lee | ............... | A61M 16/0051 340/626 |
| 2012/0037243 A1 ‡ | 2/2012 | Taylor | ............... | F16K 17/196 137/209 |
| 2015/0041011 A1 * | 2/2015 | Tiger | ............... | B64D 37/32 137/624.27 |
| 2018/0093825 A1 ‡ | 4/2018 | Young | ............... | F17C 3/10 |
| 2018/0106430 A1 | 4/2018 | Young et al. | | |

\* cited by examiner

‡ imported from a related application

LOW VOLUME NITROGEN SYSTEMS

CLAIM OF PRIORITY

The present application includes subject matter disclosed in and claims priority to a provisional application entitled "Low Volume Nitrogen Systems" filed Oct. 13, 2016 and assigned Ser. No. 62/408,005, and non-provisional patent application similarly entitled filed Oct. 12, 2017 assigned Ser. No. 15/782,472 describing an invention made by the present inventors.

1. FIELD OF THE INVENTION

The present invention is directed to maintenance of low-volume hydrocarbon tank systems. The present invention is more directly related to the systems and methods for use of inert gas to maintain hydrocarbon tanks.

2. BACKGROUND OF THE INVENTION

Nitrogen Blanketing has been proposed to stabilize the vapor/gas in the ullage above the liquid fuel level within hydrocarbon fuel tanks. However, small above ground tanks, or low volume tanks, that may or not have been treated with an inert gas (such as a nitrogen gas, a noble gas, or compound gas, or other gas known in the art to provide passive preservative and/or prevention of oxidation) will often leach the inert ullage gas to the environment by venting during high pressure events, during discharge, leaking, etc. For small above ground tanks such as home heating oil tanks the daily, seasonal, or exposure to sun/elements, will cause the tank to heat up or otherwise experience higher pressure events as the gas and hydrocarbon fuel expands (sometimes via vaporization, etc.). Often tanks exposed to the elements may "breathe-out" during the day/sun exposure, and "breathe-in" at night when temperature drop. These high pressures are often alleviated by venting gas to the environment. Similarly, during low-pressure events, the vent may allow uptake of ambient air (which may include water vapor) into the tank. Water vapor entering the tanks ullage can interact and absorb into the liquid hydrocarbon, or otherwise provide for a breeding ground for oxidative events and/or bacteria growth. This also applies to tanks that have low throughput volumes of fuel, (back-up) generators and storage tanks that may have small and large tanks (such as for cellular towers), or tanks that have low throughput fuel volumes and mobile tanks (such as railcar and train engines or other vehicle tanks). Biodiesel is particularly hygroscopic (absorbs water) leading to phase separation and may cause Fatty Acid Methyl Ester (commonly referred to as FAME), allowing organics (such as bacteria, etc.) to consume/digest the diesel or fuel.

A common solution to water entering the system, (typically through the vent (in/out) is use of desiccant (tablets) in or in absence with a filter. Desiccants used in the air intake may be a pellet of granulated desiccant. This desiccant system is used in long-term storage tanks that "breath." However, over long periods of time, the desiccants lose potency, and/or may not be able to keep up with high demand for intake air.

While there are more complex systems for protecting underground storage tanks and above-ground storage tanks (USTs and ASTs), the benefit of using a dry inert gas, such as Nitrogen, to prevent moist air from being pulled into a tank from the normal diurnal heating and cooling or due to the removal or use of the fuel in a tank. Nitrogen fills a large portion 25-80%, but more preferably 100% of the gas in the ullage. $N_2$ is not immiscible with hydrocarbon vapors, and typically lighter (with the exception of very light hydrocarbons (perhaps e.g., methane) that may be lighter than $N_2$ and pass through $N_2$ blanket) thus will sit at top of tank. $N_2$ will be vented at high pressure events and prevent hydrocarbon off-gassing. During dispensation of fuel from the tank, gas must be interred in the tank (ullage). Preferably, such gas is provided by a source of inert gas.

Moist air condensing on the inside of said tank, or condensation, provides water necessary for microbes to multiply in the ullage of a tank, the water that runs down the sides of the tank or precipitates into the fuel, all provide water for the microbes in the tank and the fuel to multiply. The water may run to the bottom of the tank (below liquid hydrocarbon fuel) and accumulate in the bottom of the tank leading to further damage to the tank bottom surface, and/or may contaminate and degrade the fuel further. If enough water accumulates, the water may be pulled into the delivery portion of the fuel system. This combination of microbes (one example of common bacteria that is damaging to fuel, acetobacter, commonly found in fuel and air) excrete acetic acid. This acid, along with other organic and inorganic compounds, have been documented to produce phosphoric and other very aggressive acids acidifying the fuel, damaging tanks and tank equipment. Additionally, this acidification will corrode and destroy fuel delivery components and the fuel line to equipment downstream of the tank including engines or boiler furnaces. The corrosion of the tank material can drop particles large and small in the tank. The particles drop to the bottom of the tank and cause microbial colonies. Also, smaller particles that fall into the fuel may become suspended in the fuel during movement, vibration, or fuel delivery into the tank. The particles that fall into the tank will clog filters and causing abrasive wear in fueling components.

Nitrogen that flows into the headspace of a tank, can prevent the normal/ambient air from being pulled into the tank. The inert gas displaces the moist air that would have flowed into the tank to alleviate partial vacuum. The inert gas reduces/eliminates water availability onto tank ullage surfaces, water running/dripping into the fuel, and displaces the oxygen that would have been pulled in with the (moist) air normally aspirated into the tank. The inert gas reduces/eliminates the potential of explosion in what is normally a hydrocarbon vapor filled space of fuel and air, the ullage of the tank. Replacing the oxygen with $N_2$ deprives the aerobic microbes of the O2 needed to reproduce in the ullage of the tank. By replacing most of the oxygen available to the surface of the fuel with nitrogen, oxidation, a normal event with fuel exposed to oxygen is reduced.

Therefore, a dry inert gas, such as nitrogen, source is desirable to inert the headspace of a low-volume tank to prevent fuel contamination and equipment damage.

Therefore, it is an object of the present invention to provide an apparatus capable of providing an inert gas on demand to a hydrocarbon fuel tank.

It is a further object of the present invention to provide a method for maintaining a hydrocarbon fuel tank.

These and other objects of the present invention will become apparent to those skilled in the art as the description thereof proceeds.

SUMMARY OF THE INVENTION

The present invention includes an automated hydrocarbon tank maintenance system whereby a hydrocarbon tank is used. The tank would include a standard liquid fuel line level and an ullage. The tank will be vented via a tank system. Preferably, the vent emanates via a pipe at the top (or side) of the tank through a pressure vacuum relief valve and out of a vent exit. A source of inert gas (such as nitrogen) is in fluid communication with the tank, preferably at the vent system, and more preferably connected directly or indirectly near or at the PV valve. The source may include a reservoir tank and/or a nitrogen generator. The inert gas supply source is in fluid communication with the ullage, wherein it can provide an inert gas into the tank system to fill the ullage (and prevent in-gassing from atmosphere). A pressure regulator joins the inert gas source with the vent, and the pressure regulator selectively allows inert gas to enter the hydrocarbon tank when a low-pressure is registered below a first predetermined low-pressure threshold.

The pressure regulator may be coupled to the pressure relief valve. The pressure regulator may open the vent system to accept gas from an external source (i.e., ambient atmosphere) when the pressure regulator registers a low-pressure below a second predetermined low-pressure threshold which is further below the first low-pressure threshold. The first predetermined low-pressure level may be set at approximately (give or take 100% pressure relative to 0 inches of pressure) two inches of water column pressure. The second predetermined low-pressure level may be set approximately (give or take 100% pressure relative to 0 inches of pressure) at or below negative four inches of water column pressure, but will be set at or below the first threshold.

A differential pressure switch may be used to activate an alarm when the lower second predetermined low-pressure threshold is met. The alarm may be in communication with said differential pressure switch and the switch may set off the alarm when the lower pressure condition is met. The alarm may be powered by an electrical power source, and may provide an audible, and/or wireless communication alert.

The invention may include a dual tank system for maintenance of hydrocarbon storage systems. A hydrocarbon tank can include a vent system with a pressure relief valve and a gauge to monitor and display a tank pressure. A source of inert gas (e.g., nitrogen gas) is in fluid communication with the interior of the tank and capable of supplying an inert gas thereto via a conduit. A pressure regulator may be coupled to the conduit between the source and hydrocarbon tank interior, whereby the pressure regulator controls inert gas entry into the hydrocarbon tank from the source when the pressure regulator registers a low-pressure below a first predetermined low-pressure threshold. An alarm may be used. The Source of inert gas may also include a nitrogen or inert gas generator with a compressor and filter.

The present invention also includes a method to maintain and monitor a hydrocarbon tank system via an inert gas source coupled to the tank. Hydrocarbon fuel is provided into the tank. The tank is then pressure sealed. A source of inert gas is coupled to the tank along a conduit having a pressure regulator. The tank ullage may be initialized by replacing the ambient gas in the ullage with inert gas. During operation, inert gas is released from the source of inert gas into the tank when the pressure regulator senses an internal tank pressure below a first predetermined threshold. The conduit may be coupled to the tank via a pressure relief valve.

High pressure may be relieved from the tank via the pressure relief valve when the tank pressure exceeds a second predetermined high threshold. When a third, lowest threshold is met, such as no or negative pressure in the tank relative to the atmosphere, an alarm alerting than internal tank pressure is too low may go off. The alarm may be audible at the site, and/or may be made via a wireless signal to a remote receiver.

BRIEF DESCRIPTION OF THE DRAWINGS

The present invention will be described with greater specificity and clarity with reference to the following drawings, in which.

DETAILED DESCRIPTION OF THE PREFERRED EMBODIMENTS

Figure 1:
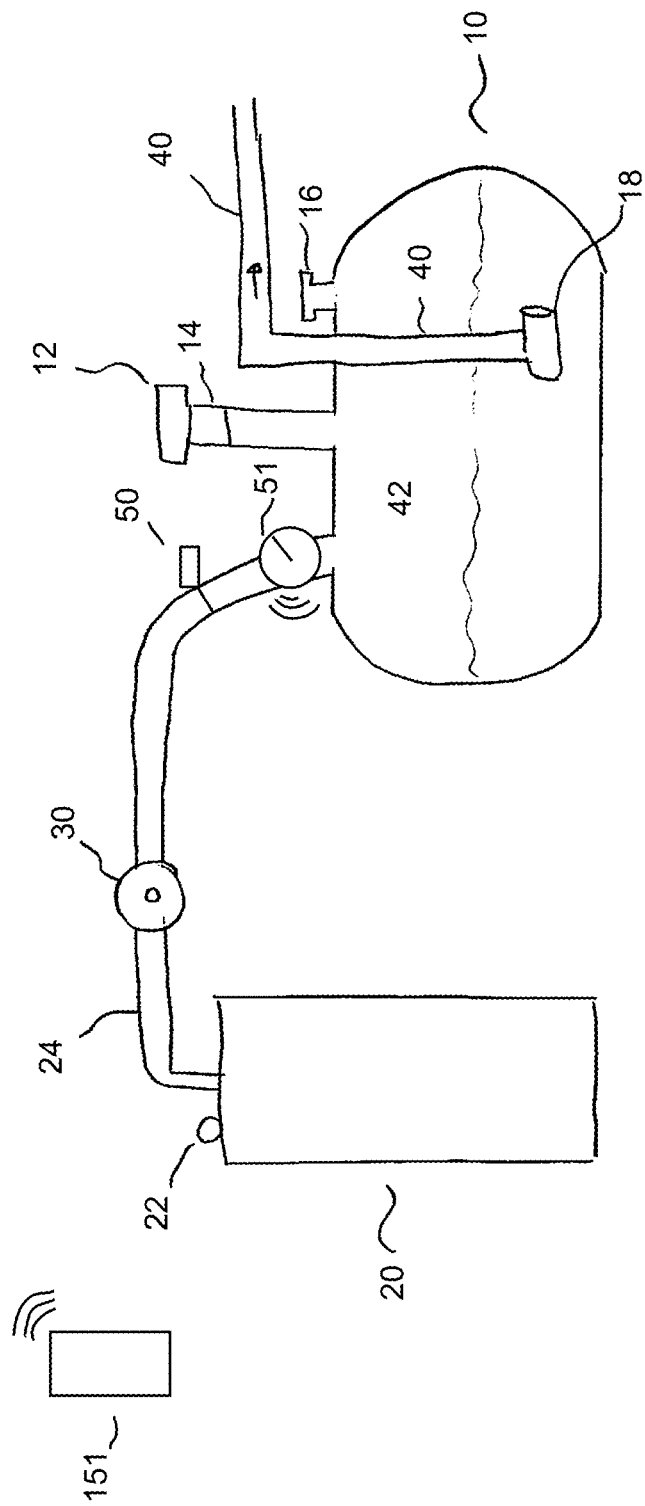
FIG. 1 demonstrates a small tank embodiment of the present invention.

A dry inert gas source connected to a low-pressure regulator in communication with the tank ullage, such tank having a vent in communication with the tank ullage and atmospheric pressure, the vent capped with a pressure vacuum valve. The low-pressure regulator set to release N2 above the opening pressure of the vacuum side of the P/V valve and shutoff below the opening pressure of the pressure side of the installed P/V valve.

It is foreseen that in this configuration, there may be sites that the demand for $N_2$ is high enough at some sites that normal delivery opportunities of a vendor, or the nescience to the responsible party to swap out replacement tanks, or the volume is high enough to offset the costs involved with having a nitrogen generator onsite, may provide an opportunity to introduce small nitrogen generators or other means of producing a dry inert gas(s) in combination with a low-pressure regulator and a pressure vacuum vent.

Similarly, it is foreseen that it would be desirable to optionally include a device capable of providing hydraulic notification of a low-pressure condition with a "flag or other part or mechanism that changes position in response to a low-pressure condition. Such notification automatically providing a signal to investigate for low-pressure.

Optionally, it may be desirable to include a device capable of providing low-pressure notification such as a low-pressure, no power, differential pressure switch, that could be used with a battery/capacitor operated horn or light, or a solar recharged horn, light or similar low power Wi-Fi, cellular phone, hot spot or other device capable of signaling an alert or contacting or notifying the responsible party to check the low-pressure alert.

It may also be desirable to optionally include more sophisticated circuitry with more sophisticated measuring devices and permanent power and or a battery or electrical storage device together with or independent of a solar charger and a circuit capable of providing notification of a low-pressure condition through Wi-Fi, modem, cellular phone or other devise such as a hot spot, capable of contacting or notifying the responsible party to check the low-pressure alert.

While there are several considerations for selecting a $N_2$ source, a cost analysis and portability considerations are two significant factors. The volume of $N_2$ needed on an annual basis provides one metric. With the average home heating oil use being between 450 to 700 gallons a year, with a high season use 200-250 gallons per month, most tanks will be refilled one every few weeks. A standard high-pressure cylinder could easily provide a low-cost annual supply of $N_2$. Low volume tanks are defined as those typical in the known uses, such as at buildings (e.g., hospitals, stations), towers (e.g., cell phone, etc.) and at homes. These low volume tanks are typically under 250 gallons capacity within the container, or more likely less than 150 gallons capacity. Many of these tanks are set on the ground or merely a few feet above the ground. These tanks often include exterior surfaces that are exposed to sunlight, and the walls (when not made of fiberglass) can expand with temperature changes. Even so, those that are fiberglass experience rise in temperature due to exposure to direct (or indirect) sun and therefore the petroleum-based fuels evaporate within and raise the internal pressure. Alternative low-volume tanks can be used on railroads or on other vehicles or conveyances to provide short-term fuel to onboard power generators.

One embodiment may include a pressurized tank as a source of nitrogen, or other inert, gas. At larger sites, or when necessary for high volume use, a generator (and compressor) may be used to generate nitrogen gas at the site. This generator may be powered by solar, or other means to generate electricity. When a pressurized tank is used, no electrical equipment may be necessary when a pressure regulator is connected to the supply/source tank via a conduit to the tank. The supply is preferably connected to the venting system of a tank, and most preferably to a pressure/vacuum (pv) valve. An automated system would not require any feedback, reporting, testing on a regular manual basis, as the system could maintain the pressure and inerting of the ullage. A simplistic method (regulator and PV cap) can be used to continually refill the ullage with a source of inert gas. Once the inert gas supply is exhausted, the pressure will no longer be maintained, and an alarm may be triggered to service the system and/or replace the inert gas supply.

The invention may also include a compressor and nitrogen generator may be more practical for higher volume sites. Large truck trains used to transport fuel will often be filled and emptied on a frequent basis at many locations. Trains that use diesel on a slow basis may also benefit. Often the oils/fuels used to provide motor power, electrical power, and diesel may be stored together. Inerting the tank ullage becomes important as the use rates vary and the inerted gas prevents hydrocarbon vapors from escaping the liquid fuel and mixing to various connected tanks. An aspect of the present invention is to provide an on-board low volume inert gas system that can fill the ullage of a transport tank when emptied, and may also provide a constant automated refill of inert gas for the varied transpiration of the tank under pressure conditions and/or events.

In an automated supply system, a standard high-pressure tank cylinder may include a gauge to determine the pressure in the tank. This gauge may also be provided in combination with a low-pressure regulator. The pressure regulator can be set at a first low-pressure threshold, such as 2" water column, a high threshold at 6" water column, and a second low-pressure threshold of −4 inches of water column. A common pressure/vacuum relief vent valve on the vent line might open at high pressures (e.g., 6+ inches water column) and second lower threshold (e.g. —4 inches water column to vacuum).

The supply can be regulated at a first predetermined threshold therebetween (such as +2 inches water column) so that when pressure drops to first threshold, supply of source of inert gas automatically kicks in as by a pressure regulator or another mechanism as is known in the art. In most instances, the auto-regulated system, will not fall far below the first predetermined threshold to reach the second lower threshold, however, were an event to occur, either due to extreme demand for fuel (pumping out at a volume rate faster than can be replenished from source), a leak, or an empty inert supply source, an alarm may be sounded to alert for service.

The present invention may be intended to provide basic tank and fuel protection against water infiltration, corrosion and fuel acidification that is affecting low volume uses of fuel and storage tanks. The prevention of water moisture entering the tank may also prevent degradation of the fuel and/or prevent oxidation. In this configuration, whether due to fuel use or cooling of the fuel tank (such as in the evening or the arrival of a cold front), the tank has dry $N_2$ injected instead of drawing moist air into the tank when "breathing" in to alleviate low-pressures or vacuums. It is foreseen that in this configuration, there may be sites that the demand for $N_2$ is high enough at some sites that normal delivery opportunities of a vendor, or the failure of the responsible party to swap out replacement tanks, or the volume is high enough to offset the costs involved with having a nitrogen generator onsite, may provide an opportunity to introduce small nitrogen generators or other means of producing a dry inert gas(s) in combination with a low-pressure regulator and a pressure vacuum vent.

Similarly, it is foreseen that it would be desirable to optionally include a device capable of providing hydraulic notification of a low-pressure condition with a "flag" or other part or mechanism that changes position in response to a low-pressure condition. Such notification automatically providing a signal to investigate for low-pressure.

The $N_2$ Mobile System

Similarly, common industrial cylinders of different sizes are ideal for train cars that are transporting flammable fuels such as ethanol or gasoline. In particular, these railcar tanks are more dangerous empty than full. The $N_2$ Mobile System provides a high level of protection from explosion for empty tanker cars by filling them with $N_2$ as they are off loaded. Additionally, as has been documented in steel tanks being transported from factories to job sites, rust, corrosion is attacking the interior of these tanks due to just moisture these tanks have in them empty. The hydrocarbons left in the empty, or mostly empty, tanks and the moisture that is pulled in as the tanks are unloaded have the potential to aggressively corrode the tanks as the fuel and water support rapid microbial growth. The $N_2$ Mobile System will reduce/prevent corrosion.

As stated, the $N_2$ Mobile System will reduce/eliminate the moisture that will accumulate in the tank following the tank being unloaded. That means this moisture is eliminated from being available to transfer to the next fuel that is loaded and transported.

The $N_2$ in the tank reduces/eliminates light hydrocarbons from being present in the tank after the tank is unloaded, this is particularly important if the tanker car carried gasoline or ethanol as the light hydrocarbons can contaminate diesel that is loaded into the cars. This is a documented fact on fuel hauled as short as five miles from a terminal in over the road transports. Pressurizing the tanks with $N_2$ reduces/eliminates the light hydrocarbons availability, therefore reducing/eliminating the light hydrocarbons from being available to be absorbed from the ullage when there are changes in fuel being hauled in tanks (such as gasoline or ethanol and then diesel or raw crude). For instance, if ethanol or gasoline is hauled, when the fuel is unloaded, light hydrocarbons are left behind. If diesel is the next fuel loaded, the vapor and fuel left behind lower the flash point of the diesel. This lower flash point may in fact cause the fuel to be below the ASTM flash point, creating a dangerous, explosive fuel that is not saleable. The $N_2$ Mobile System also eliminates the chance of static discharge ignitions during filling emptying and transportation as well as other ignition possibilities.

Additionally, large diesel engines such as for trains, or other large commercial vehicles have the same issue as smaller tanks. If the air they are operating in is moist, they are pulling moist air into the tanks. These tanks are having water condense in those tanks providing the same issues discussed above, additionally if these engines are on heavy equipment or mining equipment, the air pulled into the tank will also have a high particulate of dust or other particles. These particles accumulate in the tanks and are a constant filtration issue. Therefore, the Mobile $N_2$ system is excellent for reducing damage to these tanks and their associated equipment, reducing filtration and biological issues in the fuel and equipment of such engines.

As can be shown in FIG. 1, regulator 30 joins P/V valve 14 in hydrocarbon tank with Nitrogen tank 20. The nitrogen tank may be used on small hydrocarbon tanks, or on rail cars, such as tucked under the tank or above the platform—attached to frame. This may be used at commercial or residential site and provide low-flow for small backup generator tanks. An optional gauge will allow direct or remote reading of $N_2$ supply in $N_2$ tank. Wired or wireless communication means used to communicate vendor supplier for refill. Gauge may be continuously readable. Gauge may include a trigger or stick indicator. Wireless receiver may be one commonly known in the art, such as a remote cellular smart phone, Internet hub or node, radio frequency receiver, or otherwise as may convey a useful signal, such as a notification or with further data and information to computer and/or monitor.

A differential pressure switch 50 may be used to activate an alarm tied in with gauge 51 when the lower second predetermined low-pressure threshold is met. Alarm, coupled to gauge, may be in communication with differential pressure switch 50 and the switch may set off the alarm when the lower pressure condition is met. The alarm may be powered by an electrical power source tied in with gauge, such as a battery, etc., and may provide an audible, and/or wireless communication alert to a remote receiver 151.

The preferred regulator may be a 2" water column to a 6" water column PV valve, perhaps as low as −4". Regulator allows $N_2$ to flow into tank through accessible bung or valve fitting (i.e., full gauge through orifice. The regulator only delivers $N_2$ to tank when pressure is below 2" of water column, $N_2$ flow rate is monitored and/or managed to provide a flow rate sufficient to deliver and maintain pressure.

As can be seen in the figures, FIG. 1 demonstrates one embodiment of the present invention. An inert gas supply tank, compressed nitrogen gas tank 20 provides a source of nitrogen gas to ullage 42 of hydrocarbon tank 10. Hydrocarbon tank 10 includes submersible pump 18 to draw fuel from tank 10 through discharge line 40. Emergency pressure relief valve 16 may be set at a very high-pressure threshold above the normal P/V off gas level (previously described at 6 inches water column). Hydrocarbon tank 10 includes venting system 12 including a P/V valve 14 to allow for breathing of hydrocarbon tank. Nitrogen tank 20 may include gauge 22 to determine the remaining volume, weight, etc. in nitrogen tank. Nitrogen tank may require refilling on a regular (e.g., annual, monthly, biannual, etc.) basis. Nitrogen gas is supplied via fill line 24. Fill line 24 may include a pressure regulator 30 in communication with the pressure of tank ullage 42. When the tank ullage pressure drops below a certain predetermined threshold, pressure regulator allows pressurized nitrogen gas to exit nitrogen tank 20 along fill line 24 and into hydrocarbon tank 10 ullage 42.

Figure 2:
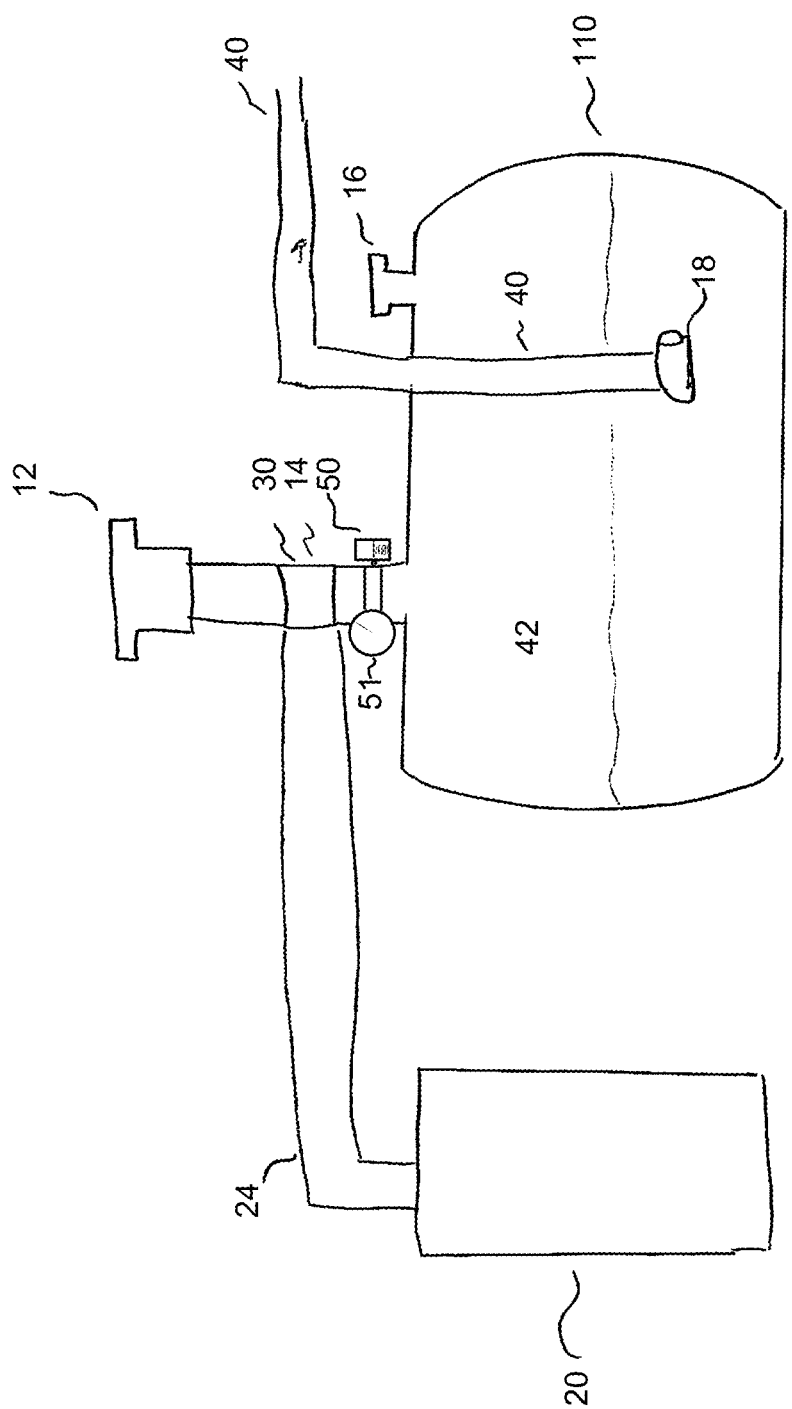
FIG. 2 demonstrates a larger tank embodiment of the present invention.

Referring to FIG. 2, a preferred embodiment of the present invention is shown. Nitrogen tank 20 supplies gas to tank 110 via fill line 24. Fill line 24 is connected to tank venting system 12, preferably at p/v valve location 14. P/V valve is preferably connected to pressure regulator 30, to supply nitrogen gas from gas source (nitrogen tank 20) into ullage 42, when ullage pressure drops below predetermined threshold. When nitrogen supply is exhausted, tank ullage is no longer regulated to remain at or above the predetermined threshold, and may drop in pressure below a lower second threshold when cooling, discharging via discharge line 40, or otherwise. An alarm may sound/go off when ullage pressure drops this low indicating either nitrogen gas refill required, tank breach, etc. An emergency exhaust valve 16 may be included for severely high pressures, to alleviate same, and may be set at the same, or higher-pressure threshold than off-gassing pressure threshold of venting system 12.

Figure 3:
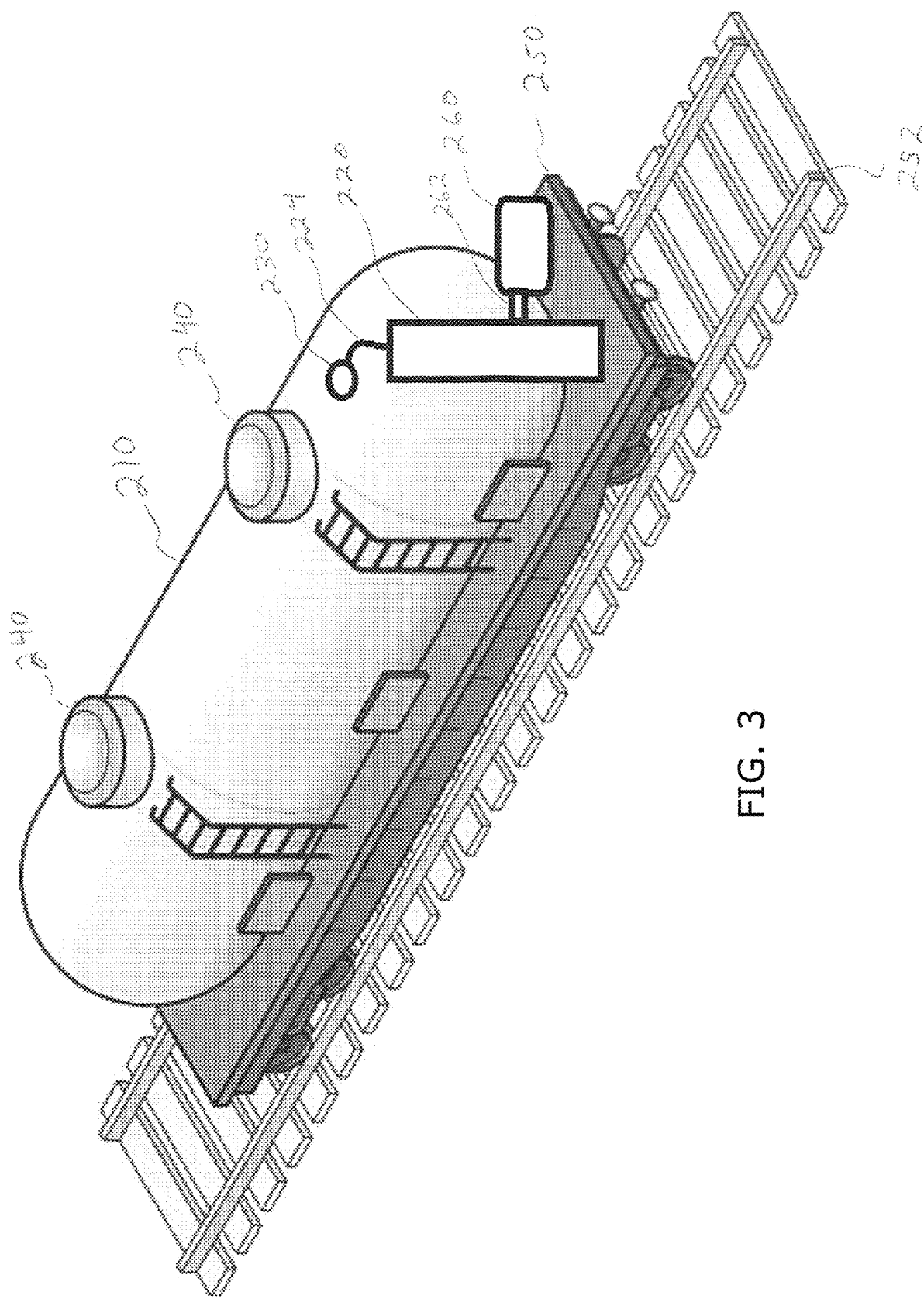
FIG. 3 demonstrates a transportable embodiment of the present invention.

Referring to FIG. 3, a mobile system is shown, here on a train car. An oil car tank 210 is provided on platform 250 to transport along tracks 252. Oil car tank may include access point 240 to allow discharge of oil/fuel. Inert gas tank 220 may be supplied on platform 250, or somewhere affixed to tank, or moving with tank, to supply inert gas to ullage of tank (not shown) via fill line 224 into a bung or access port or vent having pressure regulator 230. In this embodiment, as well as stationary embodiments, a generator may be supplied to provide on-site generation of inert gas (e.g., nitrogen gas). Generator 260 may include a compressor and filter, as is known in the art. Inert gas is supplied into inert gas tank 220 via replenish line 262 to allow inert gas tank to act as a source of inert gas. Alternatively, generator may supply inert gas directly into oil tank 210, and may be activated upon pressure sensor (alternative to pressure regulator) reading tank ullage pressure. The present invention may also be useful on petroleum transports, such as trucks or trailers, to provide inert gas stabilization on such tanks.

Tank Monitoring

As is useful for both low-volume tanks and underground storage tanks, monitoring of pressures is paramount. While P/V valves may be used, when experiencing an extreme event due to rapid ingress or egress of pressure (e.g., filling or breach, etc.). When a loader is hooking up a refill tank to a storage tank, there is a possibility that a vacuum has built up within the storage tank. When opened, the storage tank may breathe-in or otherwise ambient air is forced into the storage tank. The air or ullage in the tank may then mix with hydrocarbon vapor and saturate. This contaminated air may be vented. When there is an extreme event, a rapid depressurization event, such as triggering a ½" or as much as a predetermined level of 3" of water column pressure, an alarm may be triggered. The alarm may also set a check to determine the capacity of the $N_2$ source (either a generator or inert storage tank). Further, the system may sense the pressure more frequently or at a more sensitive measure to determine if the inert gas/$N_2$ source requires maintenance and/or refill.

It is preferred that a positive (higher relative) pressure exists in the tank relative the ambient atmospheric pressure. A Tank Pressure Management System may also allow remote monitoring of events, including fills, and use, via transmission of sensor data (pressure, N2/inert gas release/flow, temperature, exhaust, etc.). A positive relative pressure being preferred, if the system detects a pressure reading of zero (or equal to ambient pressure, for an extended period of time, this may indicate a leak, and potential exhaustion of inert/$N_2$ gas. It is preferred to maintain the tank pressure at approximately 3 inches of water pressure. Information and/or data can be remotely conveyed to a human or AI monitor to cross-reference any extreme events (e.g., weather disturbances such as tornado, low- or high-pressure-front, etc.) and alert for maintenance check when unexpected anomalous readings are found.

As discussed in this disclosure, the use of an alarm tied to the system will include either a wired or wireless system accepting data from sensors either withing or on the tank, or within the system, e.g., within a $N_2$ supply line or P/V or vent line. The alarm (and/or sensors and CPU) may be unpowered, or may be powered by battery or wired system (e.g., 110 V or 5 V, etc.), or by minor draw of fuel combusted from tank. The pressure regulator may be tied to the tank, vent, and/or inert gas supply line.

We claim:

1. An automated hydrocarbon tank maintenance system comprising:
   a. a low volume hydrocarbon tank set above the ground level and comprising a container, an ullage and a vent system, said vent system comprising a pressure relief valve;
   b. a source of inert gas coupled with said vent system, said source in fluid communication with said ullage;
   c. a pressure regulator coupled between said source and said vent system, whereby said pressure regulator adapted to allow inert gas to enter said hydrocarbon tank from said source when said pressure regulator registers a low pressure below a first predetermined low-pressure threshold, wherein said pressure regulator first predetermined low-pressure threshold is set at approximately two inches of water column pressure;
   d. wherein said pressure regulator adapted to open said vent system to accept gas from an external source when said pressure regulator registers a low pressure below a second predetermined low-pressure threshold, said second low-pressure threshold being lower than said first low-pressure threshold.

2. The automated hydrocarbon tank maintenance system of claim 1 wherein said pressure regulator is coupled to said pressure relief valve.

3. The automated hydrocarbon tank maintenance system of claim 1 wherein said tank is mounted on a rail car.

4. The automated hydrocarbon tank maintenance system of claim 1, wherein said pressure regulator second predetermined low-pressure threshold is set at or below negative four inches of water column pressure.

5. The automated hydrocarbon tank maintenance system of claim 1 further comprising a differential pressure switch adapted to be activated when said second predetermined low-pressure threshold is met.

6. The automated hydrocarbon tank maintenance system of claim 5 further comprising an alarm in communication with said differential pressure switch.

7. The automated hydrocarbon tank maintenance system of claim 6 wherein said alarm is powered by an electrical power source.

8. The automated hydrocarbon tank maintenance system of claim 1 wherein said source comprises a nitrogen generator.

9. A dual tank system for maintenance of hydrocarbon storage systems, said dual tank system comprising:
   a. a low volume hydrocarbon tank set above the ground level and comprising a container, an ullage and a vent system, said vent system comprising a pressure relief valve and a gauge to monitor and display a tank pressure;
   b. a source of inert gas coupled with said hydrocarbon tank via a conduit, said source in fluid communication with an interior of said hydrocarbon tank;
   c. a pressure regulator coupled to said conduit between said source and said hydrocarbon tank interior, whereby said pressure regulator adapted to control inert gas entry into said hydrocarbon tank from said source when said pressure regulator registers a low pressure below a first predetermined low pressure threshold, wherein said pressure regulator first predetermined low-pressure threshold is set at approximately two inches of water column pressure.

10. The dual tank system of claim 9 wherein said gauge comprises an alarm.

11. The dual tank system of claim 9 wherein said inert gas is nitrogen gas.

12. The dual tank system of claim 11 wherein said source comprises a nitrogen generator.

13. A method to maintain and monitor a hydrocarbon tank system via an inert gas source coupled to a low volume hydrocarbon fuel tank, said method comprising the steps of:
   a. providing a hydrocarbon fuel into the low volume hydrocarbon fuel tank above ground;
   b. sealing the tank;
   c. coupling the source of inert gas to the tank along a conduit having a pressure regulator;
   d. setting a first predetermined low-pressure threshold at approximately two inches of water column pressure;
   e. releasing inert gas into the tank when the pressure regulator senses an internal tank pressure below the first predetermined threshold.

14. The method of claim 13 wherein said conduit is coupled to the tank via a pressure relief valve.

15. The method of claim 14 further comprising the step of relieving pressure from the tank via the pressure relief valve when the tank pressure exceeds a second predetermined threshold.

16. The method of claim 15 further comprising the step of inerting a tank ullage by replacing an ambient gas in the ullage with inert gas prior to said step of releasing.

17. The method of claim 15 further comprising the step of alerting via an alarm when the internal tank pressure drops below a third predetermined threshold.

18. The method of claim 17 wherein the alarm is made via a wireless signal to a remote receiver.

19. The method of claim 15 wherein said pressure regulator second predetermined threshold is set at or below negative four inches of water column pressure.

20. An automated hydrocarbon tank maintenance system comprising:
   a. a low volume hydrocarbon tank set above the ground level and comprising a container, an ullage and a vent system, said vent system comprising a pressure relief valve;
   b. a source of inert gas coupled with said vent system, said source in fluid communication with said ullage;
   c. a pressure regulator coupled between said source and said vent system, whereby said pressure regulator adapted to allow inert gas to enter said hydrocarbon tank from said source when said pressure regulator registers a low pressure below a first predetermined low-pressure threshold;

wherein said pressure regulator adapted to open said vent system to accept gas from an external source when said pressure regulator registers a low pressure below a second predetermined low-pressure threshold, wherein said pressure regulator second predetermined low-pressure threshold is set at or below negative four inches of water column pressure, and said second low-pressure threshold being lower than said first low-pressure threshold.

* * * * *